(12) United States Patent
Kuppahally et al.

(10) Patent No.: US 11,880,385 B1
(45) Date of Patent: Jan. 23, 2024

(54) ORDERING UPDATES TO SECONDARY INDEXES USING CONDITIONAL OPERATIONS

(71) Applicant: Amazon Technologies, Inc., Seattle, WA (US)

(72) Inventors: Sharatkumar Nagesh Kuppahally, Issaquah, WA (US); Peter Zhivkov, Seattle, WA (US); Somasundaram Perianayagam, Seattle, WA (US); James Christopher Sorenson, III, Seattle, WA (US); Amit Gupta, Redmond, WA (US); Shishir Agrawal, Seattle, WA (US); Sagar Mundra, Seattle, WA (US); Vaibhav Jain, Karnataka (IN); Ajay Kumar, Karnataka (IN); Aman Gupta, Madhya Pradesh (IN); Ankur Tyagi, Uttar Pradesh (IN)

(73) Assignee: Amazon Technologies, Inc., Seattle, WA (US)

( * ) Notice: Subject to any disclaimer, the term of this patent is extended or adjusted under 35 U.S.C. 154(b) by 442 days.

(21) Appl. No.: 17/037,507

(22) Filed: Sep. 29, 2020

(51) Int. Cl.
  *G06F 16/00* (2019.01)
  *G06F 16/27* (2019.01)
  *G06F 16/22* (2019.01)
  *G06F 11/14* (2006.01)
  *G06F 16/23* (2019.01)

(52) U.S. Cl.
  CPC ........ *G06F 16/273* (2019.01); *G06F 11/1407* (2013.01); *G06F 16/2228* (2019.01); *G06F 16/2282* (2019.01); *G06F 16/23* (2019.01); *G06F 16/2329* (2019.01)

(58) Field of Classification Search
  CPC .............. G06F 16/273; G06F 16/2329; G06F 16/2282; G06F 16/27; G06F 16/2228; G06F 16/23
  USPC ................................................. 707/613, 609
  See application file for complete search history.

(56) References Cited

U.S. PATENT DOCUMENTS

| | | | |
|---|---|---|---|
| 5,799,305 | A | 8/1998 | Bortvedt et al. |
| 5,806,075 | A | 9/1998 | Jain et al. |
| 6,058,392 | A | 5/2000 | Sampson |

(Continued)

OTHER PUBLICATIONS

U.S. Appl. No. 15/625,976, filed Jun. 16, 2017, Sharatkumar Nagesh Kuppahally et al.

(Continued)

*Primary Examiner* — Chelcie L Daye
(74) *Attorney, Agent, or Firm* — S. Scott Foster; Kowert, Hood, Munyon, Rankin & Goetzel, P.C.

(57) ABSTRACT

Updates to projected data subsets may be ordered using conditional operations. When updates to a data set are received, a determination is made according to a schema for a projected subset of the data set as to whether the update is to be propagated to the projected subset of the data set. If the update is to be propagated, a comparison of a version identifier for the update may be made with a version identifier for the subset to determine whether performance of the update is consistent with an ordering of updates performed to the first data set. If the comparison indicates the performance of the update is consistent, then the update may be performed to the projected subset. If not, then the update may not be performed.

20 Claims, 10 Drawing Sheets

(56) References Cited

U.S. PATENT DOCUMENTS

| | | | |
|---|---|---|---|
| 6,226,650 B1 | 5/2001 | Mahajan et al. | |
| 7,269,648 B1 * | 9/2007 | Krishnan | G06F 16/27 |
| | | | 709/224 |
| 7,305,529 B1 | 12/2007 | Kekre et al. | |
| 7,356,550 B1 | 4/2008 | Lin et al. | |
| 7,490,079 B2 | 2/2009 | Shipp | |
| 7,657,574 B2 | 2/2010 | Gupta et al. | |
| 8,335,776 B2 | 12/2012 | Gokhale | |
| 8,392,482 B1 | 3/2013 | McAlister et al. | |
| 8,554,724 B2 | 10/2013 | Zunger | |
| 8,639,786 B2 | 1/2014 | Little | |
| 9,218,383 B2 | 12/2015 | Tan et al. | |
| 9,235,609 B1 | 1/2016 | Pandey et al. | |
| 9,418,130 B2 | 8/2016 | Leshchiner et al. | |
| 9,576,038 B1 | 2/2017 | Huang | |
| 9,703,814 B1 | 7/2017 | Shams et al. | |
| 10,013,449 B1 | 7/2018 | Xiao | |
| 10,146,814 B1 | 12/2018 | Gupta | |
| 10,423,493 B1 | 9/2019 | Vig | |
| 10,652,115 B1 | 5/2020 | Chen et al. | |
| 10,812,550 B1 | 10/2020 | Wells et al. | |
| 10,860,604 B1 | 12/2020 | Pandey et al. | |
| 10,936,559 B1 | 3/2021 | Jones et al. | |
| 11,068,461 B1 | 7/2021 | Chan | |
| 11,250,022 B1 | 2/2022 | Kuppahally et al. | |
| 11,314,717 B1 | 4/2022 | Certain et al. | |
| 2002/0194206 A1 | 12/2002 | Ganesh | |
| 2005/0015436 A1 * | 1/2005 | Singh | G06F 16/27 |
| | | | 707/999.01 |
| 2005/0033777 A1 | 2/2005 | Moraes | |
| 2005/0193024 A1 | 9/2005 | Beyer et al. | |
| 2005/0240531 A1 | 10/2005 | Wolff, Jr. | |
| 2006/0271510 A1 | 11/2006 | Harward | |
| 2006/0277161 A1 | 12/2006 | Sampson | |
| 2007/0050333 A1 | 3/2007 | Volger | |
| 2008/0065598 A1 | 3/2008 | Ritter | |
| 2008/0104149 A1 | 5/2008 | Vishniac | |
| 2009/0323972 A1 | 12/2009 | Kohno | |
| 2010/0132024 A1 | 5/2010 | Ben-Natan et al. | |
| 2010/0281005 A1 | 11/2010 | Carlin | |
| 2010/0318795 A1 | 12/2010 | Haddad | |
| 2011/0113117 A1 | 5/2011 | Genest et al. | |
| 2012/0096046 A1 | 4/2012 | Kucera | |
| 2012/0310878 A1 | 12/2012 | Vuksan et al. | |
| 2012/0330954 A1 | 12/2012 | Sivasubramanian et al. | |
| 2013/0013606 A1 | 1/2013 | Stanfill | |
| 2013/0132487 A1 | 5/2013 | Zhao | |
| 2013/0238556 A1 | 9/2013 | Mielenhausen | |
| 2014/0164668 A1 | 6/2014 | Charpentier | |
| 2014/0258226 A1 | 9/2014 | Noteboom | |
| 2014/0279855 A1 * | 9/2014 | Tan | G06F 16/23 |
| | | | 707/609 |
| 2014/0279881 A1 | 9/2014 | Tan | |
| 2015/0268890 A1 * | 9/2015 | Stefani | G06F 3/0644 |
| | | | 711/162 |
| 2016/0103828 A1 | 4/2016 | Woolf | |
| 2016/0132581 A1 | 5/2016 | Hsieh et al. | |
| 2016/0147859 A1 | 5/2016 | Lee | |
| 2016/0188649 A1 | 6/2016 | Tan | |
| 2016/0188690 A1 | 6/2016 | Tan | |
| 2016/0306709 A1 | 10/2016 | Shaull | |
| 2016/0364440 A1 | 12/2016 | Lee | |
| 2017/0091809 A1 | 3/2017 | Liu | |
| 2017/0116252 A1 | 4/2017 | Krishnaswamy | |
| 2017/0177700 A1 | 6/2017 | Bensberg et al. | |
| 2017/0193041 A1 | 7/2017 | Fuchs | |
| 2017/0371914 A1 | 12/2017 | Bourbonnais | |
| 2018/0322157 A1 | 11/2018 | Lee | |

OTHER PUBLICATIONS

U.S. Appl. No. 15/632,266, filed Jun. 23, 2017, Tate Andrew Certain, et al.

U.S. Appl. No. 17/670,332, filed Feb. 11, 2022, Kuppahally, et al.

\* cited by examiner

ORDERING UPDATES TO SECONDARY INDEXES USING CONDITIONAL OPERATIONS

BACKGROUND

Data is often distributed to scale the storage capacity or processing capacity of systems that provide access to the data. For example, database tables or other data objects can be divided into partitions in order to leverage the capacity of different hosts, such as different servers or other computing devices, to separately provide access to individual partitions. Replicating different portions of the partitioned data can further increase the complexity and costs of propagating changes to the data to other data replicas. For example, projections or views of a partitioned database table may be separately maintained. Propagating changes to the projection or views may increase the costs of processing updates at the original partitions of the database table as the original partitions of the database table may need to ensure that the appropriate projections or views of the database table are updated.

Figure 1:
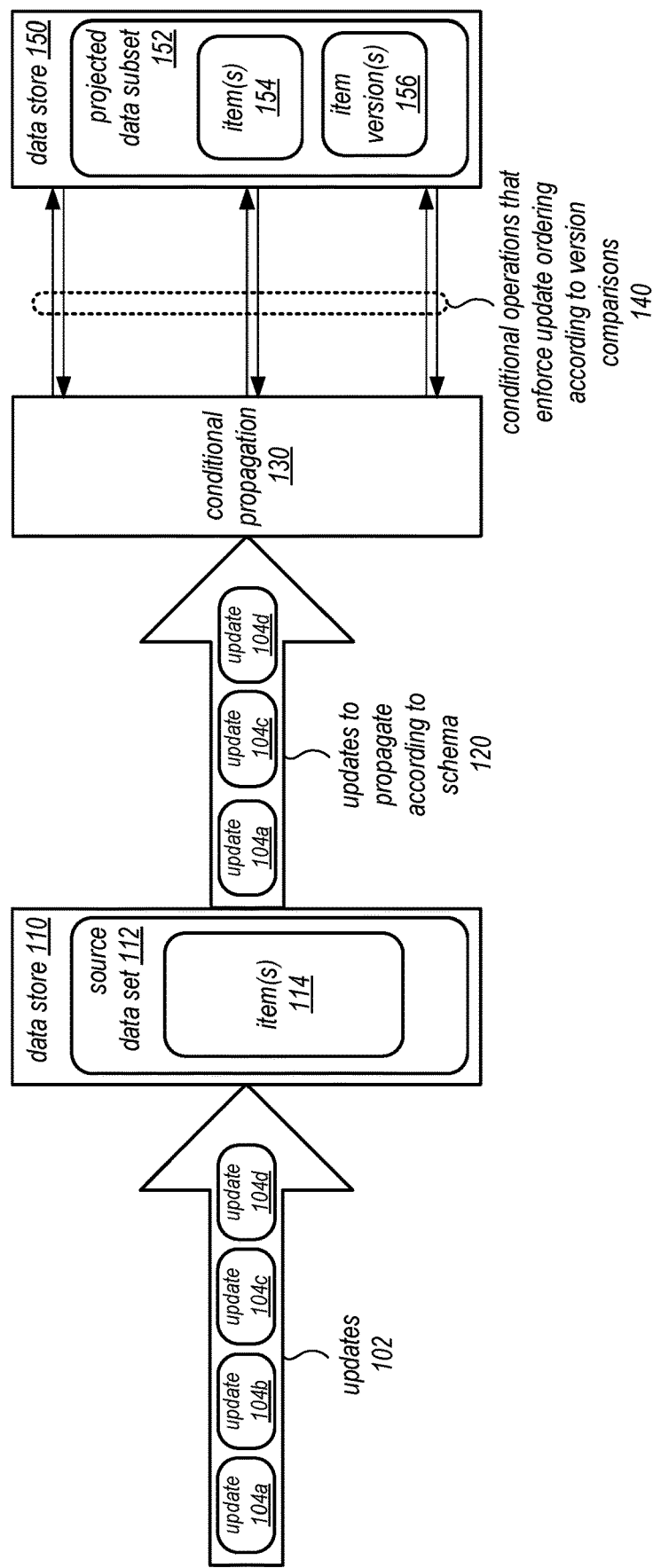
FIG. 1 is a logical block diagram illustrating ordering updates to projected data subsets using conditional operations, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The techniques described herein may implement ordering updates to secondary indexes using conditional operations. Data sets may be distributed across one or more locations in a storage system, in some embodiments. In this way, clients can access and independently update different portions of the data set at the one or more locations in the storage system, in some embodiments. The arrangement of the data set may be optimal for some access requests (e.g., queries based on indexed fields or values in a table). However, to optimally process other access requests (e.g., queries based on non-indexed fields or values in a table), portions of the data set (or the entire data set) may be replicated in one or more other locations (e.g., a different storage nodes, systems, or hosts) in a different arrangement, subset, or format that is more performant for performing the other type of access request, in some embodiments. For example, in various embodiments, a projection of data obtained from a source data set may be a subset of the source data set specified according to a different schema for the projection of data.

To maintain the replicated portions of the data set to be consistent with the data set, updates made to the data set may need to be propagated to the replicated portions of the data set, in some embodiments. For example, if a replicated portion of a data set maintains a list or view of items in the data set with a common attribute value (e.g., "gender=female"), then an update that adds an item to the data set with the common attribute value may be also propagated to the replicated portion of the data set, in one embodiment. As the number and size of replicated portions of a data set and the data set itself increase, the propagation of updates to replicated data sets may take away from the capacity of nodes, storage systems, or hosts that maintain the data set to both provide access to the data set and propagate updates to replicated portions of the data set, in some embodiments.

For example, stateful propagation protocols (e.g., queue-based protocols) can consume large amounts of memory and network bandwidth to maintain propagation state to ensure consistent ordering of updates at the replicated portion of the data set. Separate sender sessions, queues, and/or other mapping or metadata can grow quadratically with respect to a number of partitions of a database table, for instance. To minimize or reduce the memory and other resource consumption for systems participating in propagation of updates to replicated data, conditional operations may be used, in various embodiments, to eliminate the need to maintain large amounts of state information. Instead, the condition checks performed as part of a conditional operation may be used to enforce an ordering of updates at the replicated portion of data (e.g., so that an earlier value of an attribute does not overwrite a later value of the attribute). In this way, the capacity to update replicated data can be greatly increased without exceeding the capabilities of systems to propagate updates as well as perform other workloads (e.g., handle queries or other access requests at source data sets).

FIG. 1 is a logical block diagram illustrating ordering updates to projected data subsets using conditional operations, according to some embodiments. Source data set 112 may be a database table (or tables), or other set, collection, or grouping of data item(s) 114 that may be also stored in a second location, such as data store 150, as projected data subset 152. For example, as discussed in detail below with regard to FIGS. 2-5, source data set 112 may be one or more database tables and projected data subset 152 may be a secondary index. Updates 102, which may be various types of actions, modifications, or changes to source data set 112 (e.g., insert new item(s) (or attributes of items), modify item(s), delete items (or attributes of items)). These updates may be performed in some ordering at data store 110. For example, updates 104a, 104b, 104c, and 104d may be performed in a FIFO ordering where each update is performed as it is received.

Some of these updates 102 may be propagated to data store 150 to update projected data subset 152 according to a schema for the projected data subset 152. For example, items with certain attribute values may be propagated (e.g., a location attribute) that are specified by a schema (e.g., a secondary index that orders item(s) 114 by location instead of by customer identifier) whereas other attribute values (or items) may not be propagated (e.g., items with a particularly specified location attribute, such as a postal code, may be propagated whereas items with different postal codes may not be propagated). Thus as illustrated in the example in FIG. 1, only some updates (e.g., 104a, 104c and 104d) may be propagated in some scenarios (though all or none of received updates may be propagated according to whether an evaluation of the schema for the projected data subset 152 determines that the item(s) 154 are affected by the updates).

Conditional propagation 130 may be implemented to perform conditional operation(s) 140 that enforce update ordering according version comparisons, in various embodiments. Conditional operation(s) 140 may, in some embodiments, perform atomically (e.g., together or not at all) a comparison and another operation (e.g., insert, update, or delete as discussed below with regard to FIGS. 7A and 7B). For example, a timestamp, sequence number or other value may be assigned to updates 104 when received, when determined to be propagated (e.g., a timestamp assigned when the update is propagated) or using some other assignment technique (e.g., as part of the ordering for performing updates 104 at data store 110). Such values may be a version for the update which may be used in a condition supplied by the conditional operation to data store 150. If the condition is satisfied, then the operation may also be performed (or if the condition is not satisfied then the operation may not be performed). Atomicity of conditional operations may, in some embodiments, prevent a different request or operation from modifying a condition evaluated to be satisfied (or not) (e.g., by modifying an item version 156) between when the condition is evaluated and the update is applied as part of the conditional operation. Thus, if an update has a version condition that to be satisfied must be a version later than a version associated with an item to which the update is applied, that condition check can prevent out of order updates from overwriting or otherwise becoming visible to client applications that access projected data subset 152. For example, item version(s) 156 may be stored as system attributes or values, in some embodiments, which may not visible to client applications of data store 150 (e.g., a query could not access the system attributes or values that was submitted by a client of data store 150 that was not part of conditional propagation 130 (e.g., a propagation node as discussed below). Instead, conditional operations received as part of propagation may utilize the item version(s) 156 as the value to which update versions are compared. For conditional operations that fail to satisfy, the update may not need to be propagated, in some scenarios. FIGS. 3-5 and 7-8 provide further discussion of different example scenarios and conditional operations.

Please note that previous descriptions of a data store, data set, and conditional propagation are not intended to be limiting, but are merely provided as logical examples.

This specification begins with a general description of a provider network that may implement a database service that may implement ordering updates to projected data subsets, such as secondary indexes, using conditional operations. Then various examples of a database service are discussed, including different components/modules, or arrangements of components/module, that may be employed as part of implementing the database service, in some embodiments. A number of different methods and techniques to implement ordering updates to projected data subsets using conditional operations are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
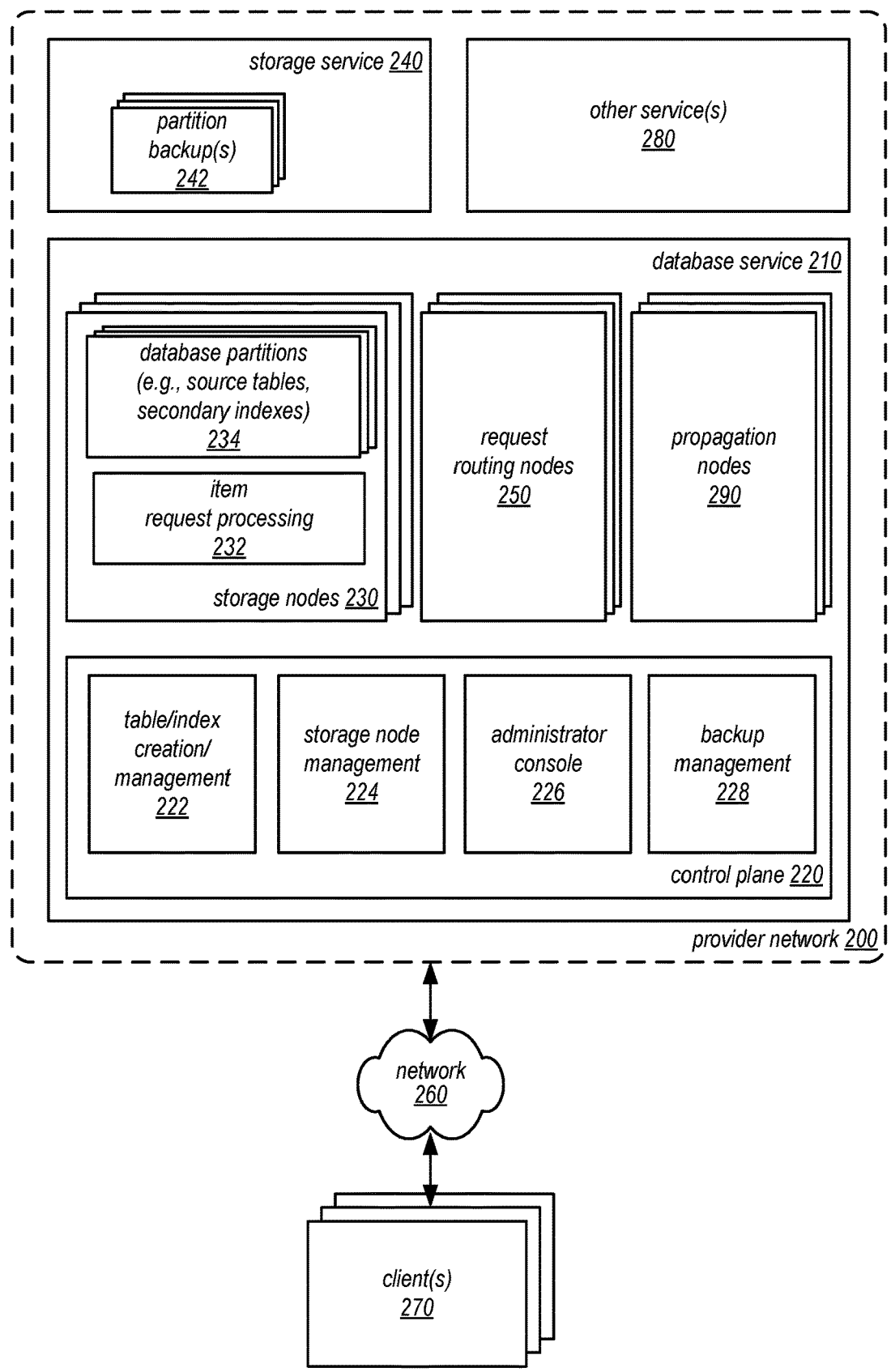
FIG. 2 is a logical block diagram illustrating a provider network offering a database service that may implement ordering updates to secondary indexes using conditional operations, according to some embodiments.

FIG. 2 is a logical block diagram illustrating a provider network offering a database service that may implement ordering updates to secondary indexes using conditional operations, according to some embodiments. Provider network 200 may be a private or closed system, in some embodiments, or may be set up by an entity such as a company or a public sector organization to provide one or more services (such as various types of cloud-based storage) accessible via the Internet and/or other networks to clients 270, in another embodiment. In some embodiments, provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network 200. In some embodiments, provider network 200 may implement various computing resources or services, such as database service 210 (e.g., a non-relational (NoSQL) database, relational database service or other database service that may utilize collections of items (e.g., tables that include items)), and other services (not illustrated), such as data flow processing service, and/or other large scale data processing techniques), data storage services (e.g., an object storage service, block-based storage service, or data storage service that may store different types of data for centralized access), virtual compute services, and/or any other type of network-based services 280 (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in some embodiments, each of which may be similar to the computer system embodiment illustrated in FIG. 9 and described below. In some embodiments, the functionality of a given system or service component (e.g., a component of database service 210) may be implemented by a particular node or may be distributed across several nodes. In some embodiments, a given node may implement the functionality of more than one service system component (e.g., more than one database service component).

Database service 210 may implement various types of distributed database services, in some embodiments, for storing, accessing, and updating data in tables (e.g., hosted in key-value database). Such services may be enterprise-class database systems that are highly scalable and extensible. In some embodiments, access requests (e.g., requests to get/obtain items, put/insert items, delete items, update or modify items, scan multiple items) may be directed to a table in database service 210 that is distributed across multiple physical resources, and the database system may be scaled up or down on an as needed basis. In some embodiments, clients/subscribers may submit requests in a number of ways, e.g., interactively via graphical user interface (e.g., a console) or a programmatic interface to the database system. In some embodiments, database service 210 may provide a RESTful programmatic interface in order to submit access requests (e.g., to get, insert, delete, or scan data). In some embodiments, a query language (e.g., Structured Query Language (SQL) may be used to specify access requests.

In some embodiments, clients 270 may encompass any type of client configurable to submit network-based requests to provider network 200 via network 260, including requests for database service 210 (e.g., to access item(s) in a table or secondary index in database service 210). For example, in some embodiments a given client 270 may include a suitable version of a web browser, or may include a plug-in module or other type of code module that executes as an extension to or within an execution environment provided by a web browser. Alternatively in a different embodiment, a client 270 may encompass an application such as a database client/application (or user interface thereof), a media application, an office application or any other application that may make use of a database in database service 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that interacts directly with provider network 200, in some embodiments. In some embodiments, client 270 may generate network-based services requests according to a Representational State Transfer (REST)-style network-based services architecture, a document- or message-based network-based services architecture, or another suitable network-based services architecture. Note that in some embodiments, clients of database service 210 may be implemented within provider network 200 (e.g., applications hosted on a virtual compute service).

In some embodiments, clients of database service 210 may be implemented on resources within provider network 200 (not illustrated). For example, a client application may be hosted on a virtual machine or other computing resources implemented as part of another provider network service that may send access requests to database service 210 via an internal network (not illustrated).

In some embodiments, a client 270 may provide access to provider network 200 to other applications in a manner that is transparent to those applications. For example, client 270 may integrate with a database on database service 210. In such an embodiment, applications may not need to be modified to make use of a service model that utilizes database service 210. Instead, the details of interfacing to the database service 210 may be coordinated by client 270.

Client(s) 270 may convey network-based services requests to and receive responses from provider network 200 via network 260, in some embodiments. In some embodiments, network 260 may encompass any suitable combination of networking hardware and protocols necessary to establish network-based-based communications between clients 270 and provider network 200. For example, network 260 may encompass the various telecommunications networks and service providers that collectively implement the Internet. In some embodiments, network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 270 and the Internet as well as between the Internet and provider network 200. It is noted that in some embodiments, client(s) 270 may communicate with provider network 200 using a private network rather than the public Internet.

Database service 210 may implement request routing nodes 250, in some embodiments. Request routing nodes 250 may receive and parse client access requests, in various embodiments in order to determine various features of the request, to parse, authenticate, throttle and/or dispatch access requests, among other things, in some embodiments. Database service 210 may implement propagation nodes 290, discussed in detail below with regard to FIGS. 3-5, which may handle propagation sessions with storage nodes, manage hot partitions, retry logic, checkpointing, and various other operations to implement propagation of updates to a secondary index.

In some embodiments, database service 210 may implement control plane 220 to implement one or more administrative components, such as automated admin nodes (not illustrated) which may provide a variety of visibility and/or control functions implemented as part of control plane 220). In various embodiments, control plane 220 may direct the performance of different types of control plane operations among the nodes, systems, or devices implementing database service 210, in some embodiments. Control plane 220 may provide visibility and control to system administrators via administrator console 226, in some embodiment. Administrator console 226 may allow system administrators to interact directly with database service 210 (and/or the underlying system). In some embodiments, the administrator console 226 may be the primary point of visibility and control for database service 210 (e.g., for configuration or reconfiguration by system administrators). For example, the administrator console 226 may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as data backup or other management operations for a table, at database service 210, in some embodiments.

Storage node management 224 may provide resource allocation, in some embodiments, for storing additional data in table submitted to database service 210. For instance, control plane 220 may communicate with processing nodes to initiate the performance of various control plane operations, such as moves of table partitions, splits of table partitions, update tables, delete tables, create indexes, etc. . . . In some embodiments, control plane 220 may include a node recovery feature or component that handles failure events for storage nodes 230, propagation nodes 290 and request routing nodes 250 (e.g., adding new nodes, removing failing or underperforming nodes, deactivating or decommissioning underutilized nodes, etc).

Various durability, resiliency, control, or other operations may be directed by control plane 220. For example, storage node management 224 may detect split, copy, or move events for multi-table partitions at storage nodes in order to ensure that the storage nodes maintain satisfy a minimum performance level for performing access requests. For instance, in various embodiments, there may be situations in which a partition (or a replica thereof) may need to be copied, e.g., from one storage node to another. For example, if there are three replicas of a particular partition, each hosted on a different physical or logical machine, and one of the machines fails, the replica hosted on that machine may need to be replaced by a new copy of the partition on another machine. In another example, if a particular machine that hosts multiple partitions of one or more tables experiences heavy traffic, one of the heavily accessed partitions may be moved (using a copy operation) to a machine that is experiencing less traffic in an attempt to more evenly distribute the system workload and improve performance. In some embodiments, storage node management 224 may perform partition moves using a physical copying mechanism (e.g., a physical file system mechanism, such as a file copy mechanism) that copies an entire partition from one machine to another, rather than copying a snapshot of the partition data row by. While the partition is being copied, write operations targeting the partition may be logged. During the copy operation, any logged write operations may be applied to the partition by a catch-up process at periodic intervals (e.g., at a series of checkpoints). Once the entire partition has been copied to the destination machine, any remaining logged write operations (i.e. any write operations performed since the last checkpoint) may be performed on the destination partition by a final catch-up process. Therefore, the data in the destination partition may be consistent following the completion of the partition move, in some embodiments. In this way, storage node management 224 can move partitions amongst storage nodes 230 while the partitions being moved are still "live" and able to accept access requests.

In some embodiments, the partition moving process described above may be employed in partition splitting operations by storage node management 224 in response to the detection of a partition split event. For example, a partition may be split because it is large, e.g., when it becomes too big to fit on one machine or storage device and/or in order to keep the partition size small enough to quickly rebuild the partitions hosted on a single machine (using a large number of parallel processes) in the event of a machine failure. A partition may also be split when it becomes too "hot" (i.e. when it experiences a much greater than average amount of traffic as compared to other partitions). For example, if the workload changes suddenly and/or dramatically for a given partition, the system may be configured to react quickly to the change. In some embodiments, the partition splitting process described herein may be transparent to applications and clients/users, which may allow the data storage service to be scaled automatically (i.e. without requiring client/user intervention or initiation).

In some embodiments, each database partition 234 may be identified by a partition ID, which may be a unique number (e.g., a GUID) assigned at the time the partition is created. A partition 234 may also have a version number that is incremented each time the partition goes through a reconfiguration (e.g., in response to adding or removing replicas, but not necessarily in response to a primary node failover). When a partition is split, two new partitions may be created, each of which may have a respective new partition ID, and the original partition ID may no longer be used, in some embodiments. In some embodiments, a partition may be split by the system using a split tool or process in response to changing conditions.

Split or move events may be detected by storage node management 224 in various ways. For example, partition size and heat, where heat may be tracked by internally measured metrics (such as IOPS), externally measured metrics (such as latency), and/or other factors may be evaluated with respect to various performance thresholds.

System anomalies may also trigger split or move events (e.g., network partitions that disrupt communications between replicas of a partition in a replica group, in some embodiments. Storage node management 224 may detect storage node failures, or provide other anomaly control, in some embodiments. If the partition replica hosted on the storage node on which a fault or failure was detected was the primary for its replica group, a new primary may be elected for the replica group (e.g., from amongst remaining storage nodes in the replica group). Storage node management 224 may initiate creation of a replacement partition replica while the source partition replica is live (i.e. while one or more of the replicas of the partition continue to accept and service requests directed to the partition), in some embodiments. In various embodiments, the partition replica on the faulty storage node may be used as the source partition replica, or another replica for same partition (on a working machine) may be used as the source partition replica, e.g., depending type and/or severity of the detected fault.

Control plane 220 may implement table creation and management 222 to manage the creation (or deletion) of database tables hosed in database service 210, in some embodiments. For example, a request to create a table may be submitted via administrator console 226 which may initiate performance of a workflow to generate appropriate system metadata (e.g., a table identifier that is unique with respect to all other tables in database service 210, table performance or configuration parameters, etc.). Table creation/management 222 may also implement features to create tables and secondary indexes. Backup management 228 may handle the creation of backup requests to make copies as of a version or point-in-time of a database, as backup partitions 242 in storage service 240.

In some embodiments, database service 210 may also implement a plurality of storage nodes 230, each of which may manage one or more partitions of a database table on behalf of clients/users or on behalf of database service 210 which may be stored in database storage 234 (on storage devices attached to storage nodes 230 or in network storage accessible to storage nodes 230).

Storage nodes 230 may implement item request processing 232, in some embodiments. Item request processing 232 may perform various operations (e.g., read/get, write/update/modify/change, insert/add, or delete/remove) to access individual items stored in tables in database service 210, in some embodiments. In some embodiments, item request processing 232 may support operations performed as part of a transaction, including techniques such as locking items in a transaction and/or ordering requests to operate on an item as part of transaction along with other requests according to timestamps (e.g., timestamp ordering) so that storage nodes 230 can accept or reject the transaction-related requests. In some embodiments, item request processing 232 may maintain database partitions 234 according to a database model (e.g., a non-relational, NoSQL, or other key-value database model).

In some embodiments, database service 210 may provide functionality for creating, accessing, and/or managing tables or secondary indexes at nodes within a multi-tenant environment. For example, database partitions 234 may store table item(s) from multiple tables, indexes, or other data stored on behalf of different clients, applications, users, accounts or non-related entities, in some embodiments. Thus database partitions 234 may be multi-tenant, in some embodiments when storing items from different database tables. In some embodiments, an index may include table items (e.g., in a B+ tree).

In addition to dividing or otherwise distributing data (e.g., database tables) across storage nodes 230 in separate partitions, storage nodes 230 may also be used in multiple different arrangements for providing resiliency and/or durability of data as part of larger collections or groups of resources. A replica group, for example, may be composed of a number of storage nodes maintaining a replica of particular portion of data (e.g., a partition) for the database service 210, as discussed below with regard to FIG. 3. Moreover, different replica groups may utilize overlapping nodes, where a storage node 230 may be a member of multiple replica groups, maintaining replicas for each of those groups whose other storage node 230 members differ from the other replica groups.

Different models, schemas or formats for storing data for database tables in database service 210 may be implemented, in some embodiments. For example, in some embodiments, non-relational, NoSQL, semi-structured, or other key-value data formats may be implemented. In at least some embodiments, the data model may include tables containing items that have one or more attributes. In such embodiments, each table maintained on behalf of a client/user may include one or more items, and each item may include a collection of one or more attributes. The attributes of an item may be a collection of one or more name-value pairs, in any order, in some embodiments. In some embodiments, each attribute in an item may have a name, a type, and a value. In some embodiments, the items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, the tables maintained by the database service 210 (and the underlying storage system) may have no predefined schema other than their reliance on the primary key.

Metadata or other system data for tables may also be stored as part of database partitions using similar partitioning schemes and using similar indexes, in some embodiments.

Database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by database service 210 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes, and/or describe tables or secondary indexes, and create and/or associate functions with tables. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by database service 210 (and/or the underlying system) may be used to perform item-level operations, such as requests for individual items or for multiple items in one or more tables table, such as queries, batch operations, and/or scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Database service 210 may include support for some or all of the following operations on data maintained in a table (or index) by the service on behalf of a storage service client: create a secondary index, perform a transaction (inclusive of one or more operations on one or more items in one or more tables), put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the database service 210 (and/or underlying system) described herein may provide various data plane APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

Storage service 240 may be file, object-based, or other type of storage service that may be used to store backups 242. Storage service 240 may implement striping, sharding, or other data distribution techniques so that different portions of a partition backup 242 are stored across multiple locations (e.g., at separate nodes). For example, storage service 240 may provide utilize different types of redundancy or other distribution techniques to provide a highdurability, low cost data store (which may not be as performant as database service 210 for accessing data).

Figure 3:
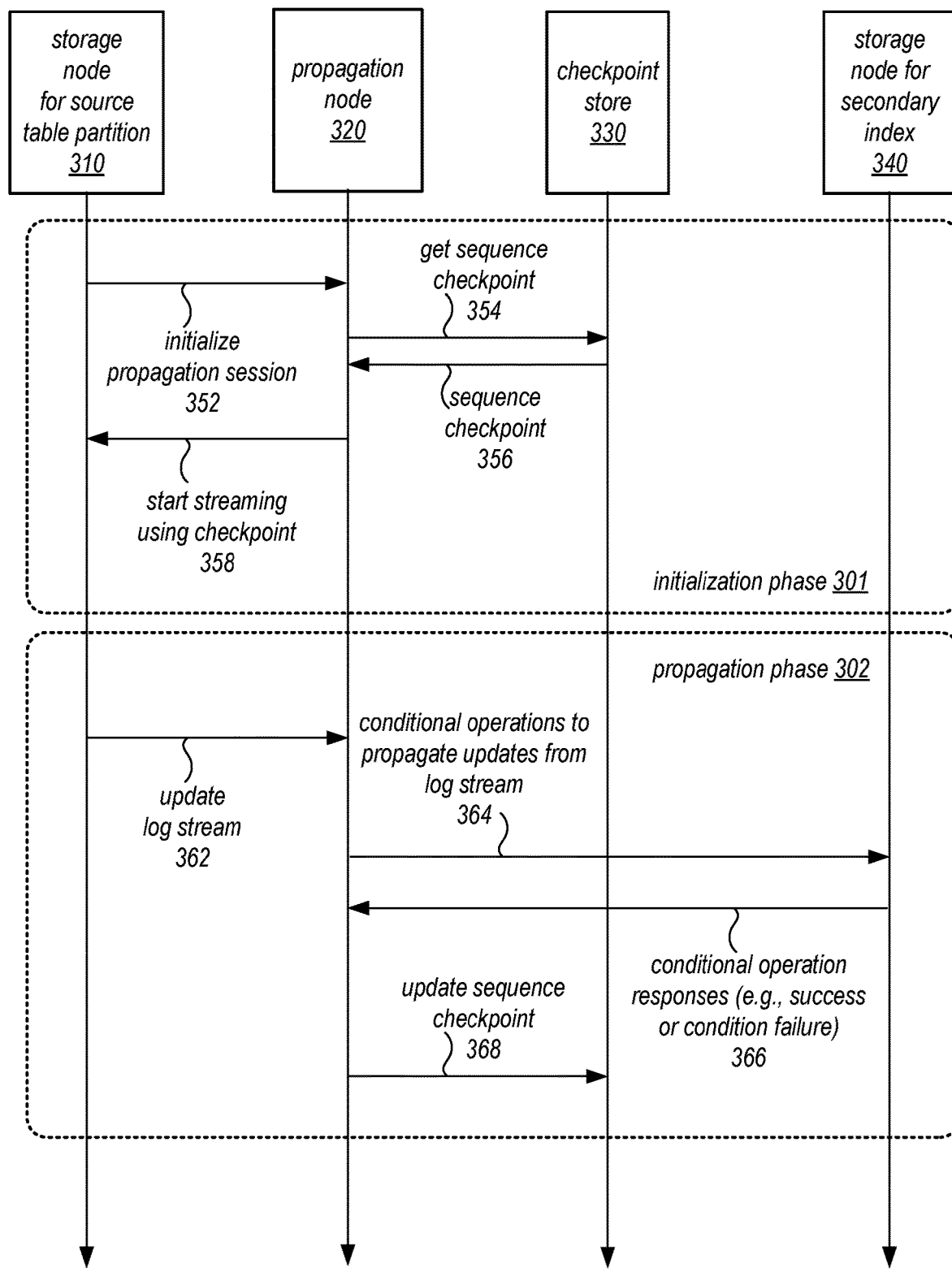
FIG. 3 is a logical block diagram illustrating interactions to initialize and perform conditional operations at a propagation node, according to some embodiments.

FIG. 3 is a logical block diagram illustrating interactions to initialize and perform conditional operations at a propagation node, according to some embodiments. Storage node for source table partition 310 may select, assign (or be assigned) propagation node 320. For example, propagation node 320 may be one of multiple propagation nodes that are made available to be provisioned (e.g., from a pool or fleet of propagation nodes), which control plane 220 may assign to a secondary index or from which storage node 310 may directly request or receive propagation node 320. Storage node 310 may send a request to initialize a propagation session 352 (which may include various information about the secondary index (e.g., number of partitions and storage node(s) storing the secondary index partitions) and source table partition in order to perform propagation). Propagation node 320 may request 354 and get sequence checkpoint 356 from checkpoint store 330. For example, checkpoint store 330 may be an external storage service (e.g., storage service 240) or internal storage system (e.g., another database table or other type of storage system) which may store the sequence checkpoint for created secondary indexes (which may be updated as discussed below). Request 354 may identify the secondary index (e.g., by an identifier) and/or provide other information in order to lookup the sequence checkpoint 356 at checkpoint store 330. Propagation node 320 may then request storage node 310 to start stream of updates, as indicated at 358 from a point in the sequence of updates identified by the checkpoint. For example, storage node 310 may support an update log stream for requesting subscribers, such as propagation node 320 and may send records from the update log stream starting from the point specified by the subscriber (e.g., the checkpoint specified by propagation node 320).

The above interactions may be performed as part of an initialization phase 301, in some embodiments. For example, an initialization phase may be implemented when storage node 310 takes over a as a new primary node for a replica group, in some embodiments.

Propagation phase 302 may be an ongoing (e.g., steady-state) phase, in various embodiments. For example, update log stream 362 may be provided by storage node 310 to propagation node 320. Update log stream may include records, messages, notifications, or other descriptions of updates to a source table partition, which may be provided to propagation node 320 (e.g., according to an order in which the updates were performed at storage node 310). Propagation node 320 may perform conditional operations to propagate updates from the log stream, as indicated at 364 to storage node for secondary index 340. Different types of conditional operations, such as those discussed below with regard to FIGS. 4, 5, 7A and 7B may be performed according to the type of update indicated in update log stream (e.g., insert, modify, delete, etc.) If no response is received, propagation node 320 may retry conditional operations, in some embodiments.

The conditional operation responses (e.g., success or condition failure) 366 may be indicate to propagation node 320 how far to advance a sequence checkpoint 368 (which may be updated periodically by storing a single checkpoint for the entire table, or checkpoints for individual partitions of a source table (to avoid having one lagging partition cause significant replay for other partitions). For example, partition A of a source table may have a later checkpoint than partition B of the source table. If a new initialization phase for one of the source table partitions is started (e.g., for A), then that checkpoint for that partition may be used. In this way, the start of streaming for partition A may avoid sending the updates in the update log stream that would have to be sent if the checkpoint were the earlier checkpoint for partition B. Conversely, if the initialization phase were for partition B, then no updates would be missed that were described in changes in the update stream between the checkpoint for partition B and partition A as the updates in the update log stream would be sent starting from the checkpoint for partition B.

Although not illustrated, in some embodiments propagation node 320 may also provide status or other information to storage node 310 as part of propagation phase 302 (e.g., as part of a heartbeat communication). For example, propagation node 320 may indicate the checkpoint sequence number (or other sequence number) so that storage node 310 can trim, reclaim, or otherwise garbage collect storage for update log stream (e.g., by removing log records that have been sent and propagated if needed according to the secondary index schema as indicated by the checkpoint sequence number).

Figure 4:
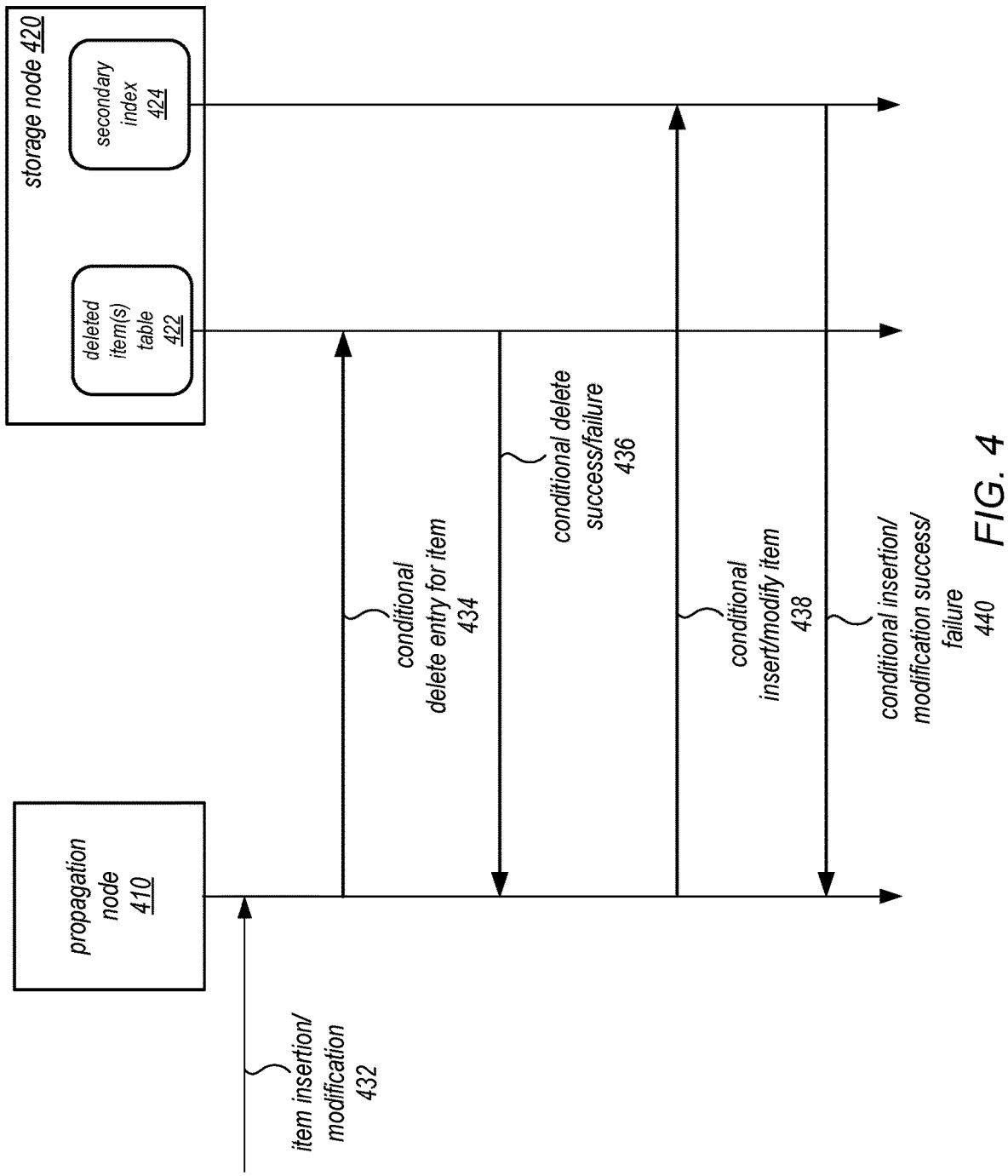
FIG. 4 is a logical block diagram illustrating example interactions to propagate an update that is a modification or insertion, according to some embodiments.

FIG. 4 is a logical block diagram illustrating example interactions to propagate an update that is a modification or insertion, according to some embodiments. Propagation node 410 may receive, as indicated at 432, an insertion or modification of an item 432 (e.g., to modify an existing item attribute, remove an existing item attribute, insert a new item attribute, or insert an entirely new item) that was performed at a source table partition. In some embodiments, propagation node 434 may perform a conditional delete entry for the item 434 on deleted item(s) table 422 at storage node 420. Deleted item(s) table 422 may store or identify those items that have deleted from a secondary index, in various embodiments. Like a partition of items stored for secondary index 424, these items may also include version information (e.g., a sequence number or timestamp) associated with the performance of the delete. The conditional delete entry 434 may succeed or fail according to a version number associated with the item insertion/modification 432. As indicated at 436, success or failure may be returned to indicate whether the insertion/modification can proceed, in some embodiments. If so, then conditional insert/modify item 438 may be sent to insert or modify the item in secondary index 424 using the version for the insertion/modification as the condition to be compared with the version of the affected item in secondary index 424. If the version of the insertion/modification is later than the version of the item in secondary index 424, then a success may be returned, as indicated at 440. If not, a failure may be returned, as indicated at 440.

Figure 5:
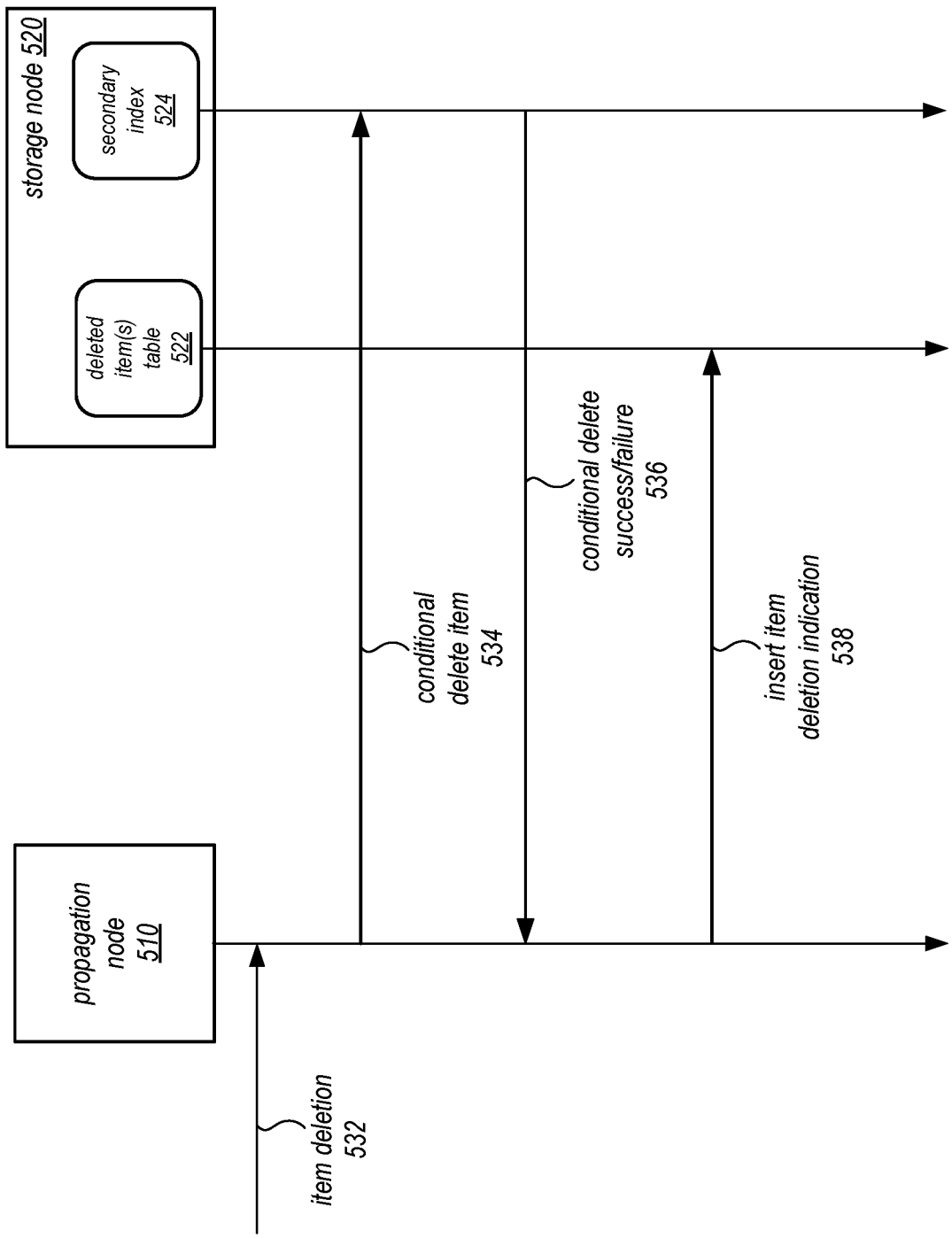
FIG. 5 is a logical block diagram illustrating example interactions to propagate an update that is a deletion, according to some embodiments.

FIG. 5 is a logical block diagram illustrating example interactions to propagate an update that is a deletion, according to some embodiments. Propagation node 510 may receive an item deletion 532 to propagate. In various embodiments, propagation node 510 may perform a conditional delete operation with the version for the deletion (e.g., a timestamp) to secondary index 524 at storage node 520. The success or failure may be returned at 536 based on the version of the item stored in secondary index 524 (e.g., if the version of the deletion is later than the version of the item in secondary index 524). If successful, then an item deletion indication 538 may be inserted in to deleted item(s) table 522, which may include the version for the delete operation, in some embodiments.

Figure 6:
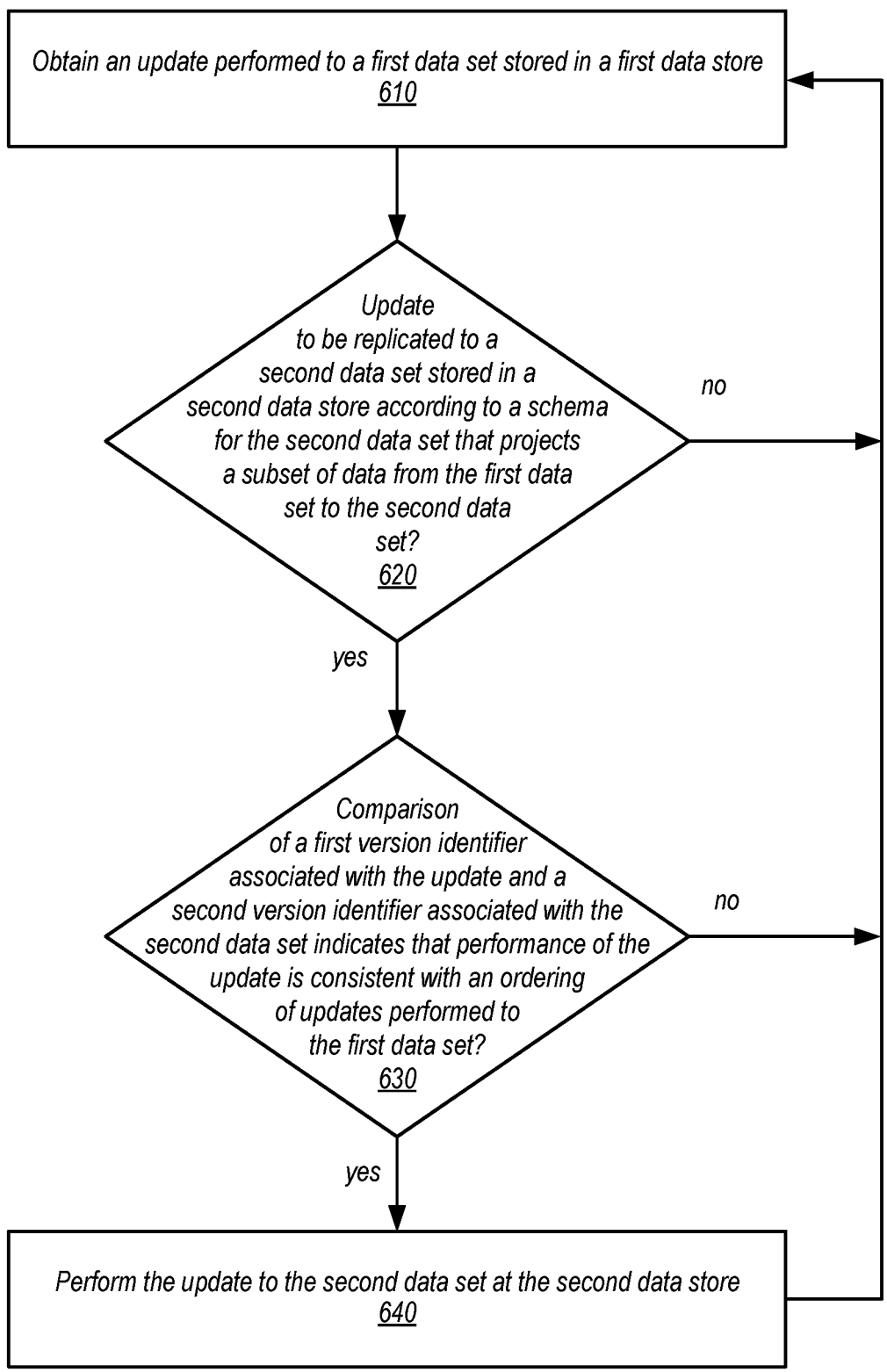
FIG. 6 is a high-level flowchart illustrating various methods and techniques to implement ordering updates to projected data subsets using conditional operations, according to some embodiments.

The examples of a database that implements ordering updates to projected data subsets using conditional operations as discussed in FIGS. 2-5 above have been given in regard to a database service (e.g., relational database, document database, non-relational database, etc.). However, various other types of database systems can advantageously implement ordering updates to projected data subsets using conditional operations, in other embodiments. FIG. 6 is a high-level flowchart illustrating various methods and techniques to implement ordering updates to projected data subsets using conditional operations, according to some embodiments. These techniques, as well as the techniques discussed with regard to FIGS. 7A-8, may be implemented using components or systems as described above with regard to FIGS. 2-5, as well as other types of databases or storage systems, and thus the following discussion is not intended to be limiting as to the other types of systems that may implement the described techniques.

As indicated at 610, an update to be performed to a first data set stored in a first data store may be obtained, in some embodiments. For example, as discussed above with regard to FIG. 1, updates may be obtained from a log of updates. In some embodiments, the update may be obtained at and propagated by the storage node (or other component) that stores the first data set (e.g., source table partition). In some embodiments, the updated may be obtained from the storage node (or other component) that stores the first data set, such as a propagation node discussed above. In some embodiments, the update may be As indicated at 620, a determination may be made as to whether the update is to be replicated to a second data set stored in a second data store according to a schema for the second data set that projects a subset of data from the first data set to the second data set. For example, the schema may specify the attribute values or other features of the first data set that are to be replicated (which may possibly include manipulations or calculations using the data, such as combining attributes, averaging values, taking a minimum or maximum of values, etc.). If an update is directed to data (e.g., an item) that would not be included in the second data set according to the schema, then as indicated by the negative exit from 620, the update may be ignored for propagation.

If an update is directed to data that would be included in the second data set according to the schema, then, as indicated at 630, the update may be conditionally performed, in various embodiments. For example, as discussed above with regard to FIG. 1, a conditional operation may be performed which may support a condition and an operation, where the condition causes the version comparison to be performed and the operation is the update to be performed. As noted above, such a conditional operation may be atomically performed, in various embodiments. If, for example, a comparison of a first version identifier associated with the update and a second version identifier associated with the second data set (e.g., a system version attribute for an affected item in the second data set) indicates that performance of the update is consistent with an ordering of updates performed to the first data set, then as indicated by the positive exit, the update may be performed to the second data set at the second data store, as indicated at 640 (e.g., by making the requested insertion, modification, or deletion). For example, version identifiers may be timestamps, in some embodiments, and the condition may be satisfied if the timestamp of the update is later than the timestamp of the item in the second data set (which would indicate that the last update to the item occurred earlier than the update under consideration and thus it would be consistent with the ordering of updates (e.g., according to timestamps) performed to the first data set to perform the update. For those comparisons that do not indicate that the performance of the update is consistent with the ordering of updates (e.g., the update timestamp is earlier than the timestamp of the item), then the conditional update may fail to perform. For instance, in such cases, performing the update would be out-of-order (e.g., an earlier updated applied after a later updated) and thus be inconsistent with the ordering of updates to the first data set.

Figure 7A:
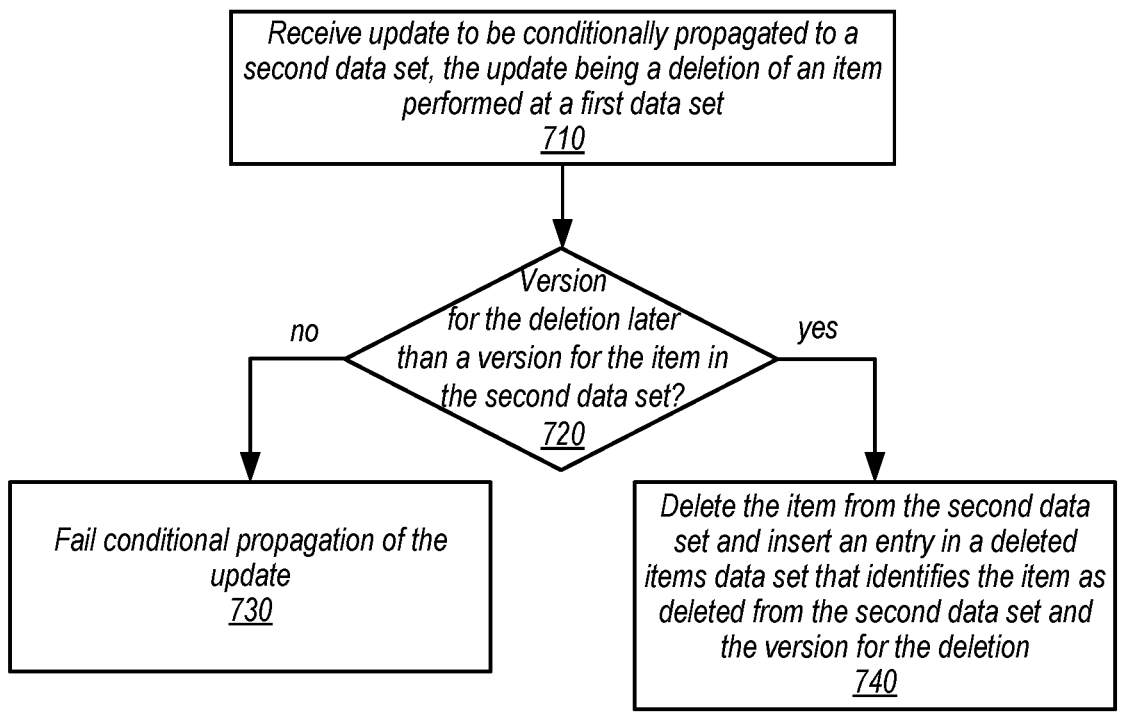
FIGS. 7A and 7B are high-level flowcharts illustrating various methods and techniques to propagate different types of updates, according to some embodiments.
Figure 7B:
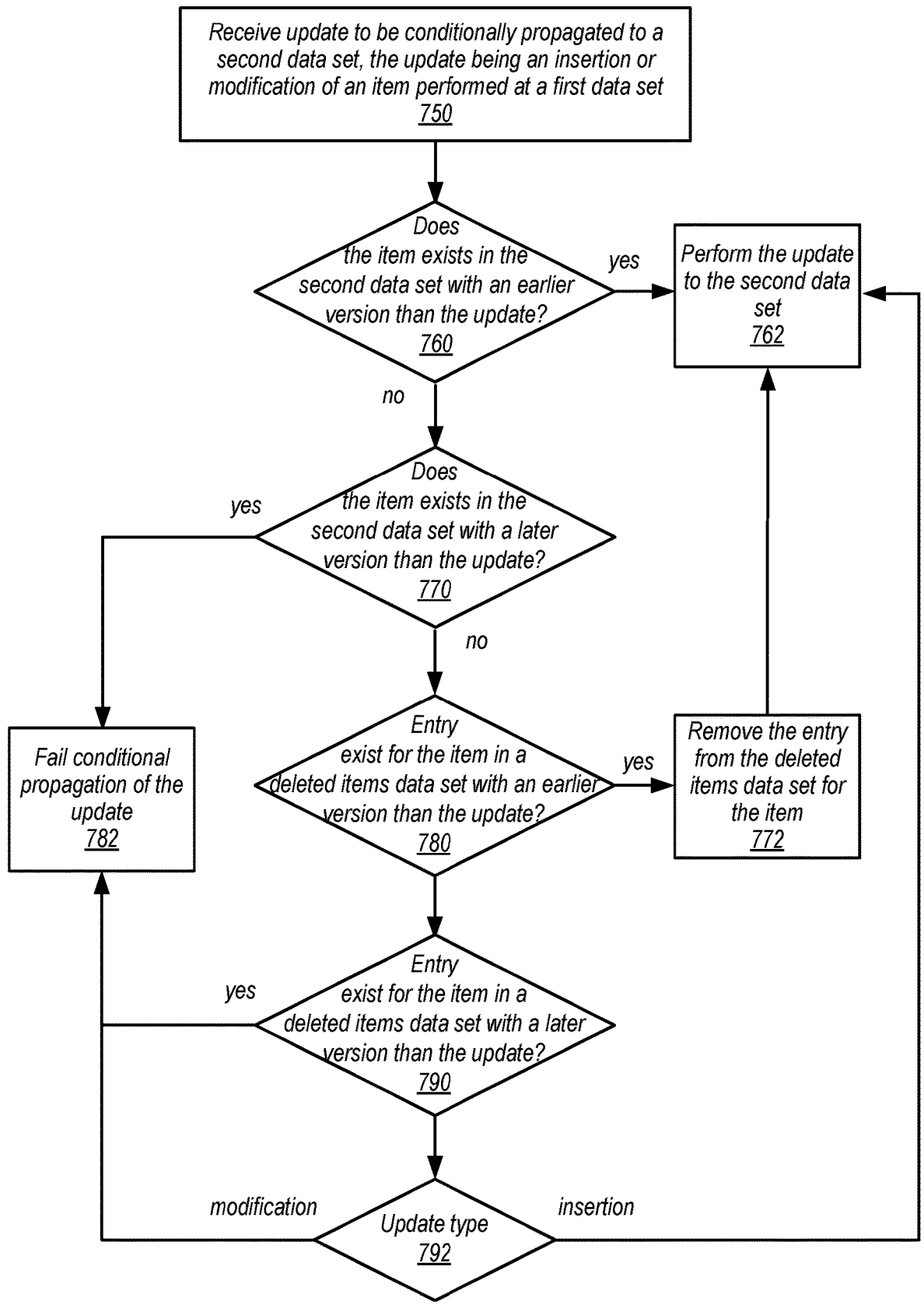

FIGS. 7A and 7B are high-level flowcharts illustrating various methods and techniques to propagate different types of updates, according to some embodiments. In FIG. 7A, deletion updates may be handled. For example, as indicated at 710, an update to be conditionally propagated may be received that is a deletion of an item, performed at the first data set. A determination may be made, as indicated at 720 (e.g., by the second data store in response to a conditional delete operation on the item), as to whether a version for the deletion is later than a version of the item in the data set. If not, then, as indicated at 730, conditional propagation of the update may be failed. If so, then as indicated at 740, the item may be deleted from the second data set and an entry may be inserted in the deleted items data set that identifies the item as deleted from the second data set and includes the version for the deletion, in some embodiments.

In FIG. 7B, insertion or modification requests may be handled. For example, as indicated at 750, an update may be received to be conditionally propagated to a second data set that is an insertion of or a modification to an item performed at the first data set, in some embodiments. If the item exists in the second data set with an earlier version than the update, as considered at 760, then the update may be performed, as indicated at 762. If the item exists in the second data set with a later version than the update, as considered at 770, then conditional propagation of the update may be failed.

As indicated at 780, a determination may be made as to whether an entry exists for the item in a deleted items data set with an earlier version than the update, in some embodiments. If so, then as indicated at 772, the entry may be removed from the deleted items data set and the update performed to the second data set, as indicated at 762. As indicated at 790, a determination may be made as to whether an entry exists for the item in the deleted item data set with a later version than the update, in some embodiments. If so, then the conditional propagation of the update may be failed, as indicated at 782. If not, then the update to the second data set may be performed when the update is an insertion of a new item as indicated at 792. When the update is a modification, then the conditional propagation of the update may fail as the item to be modified does not exist, as indicated by the modification exit from 792.

Figure 8:
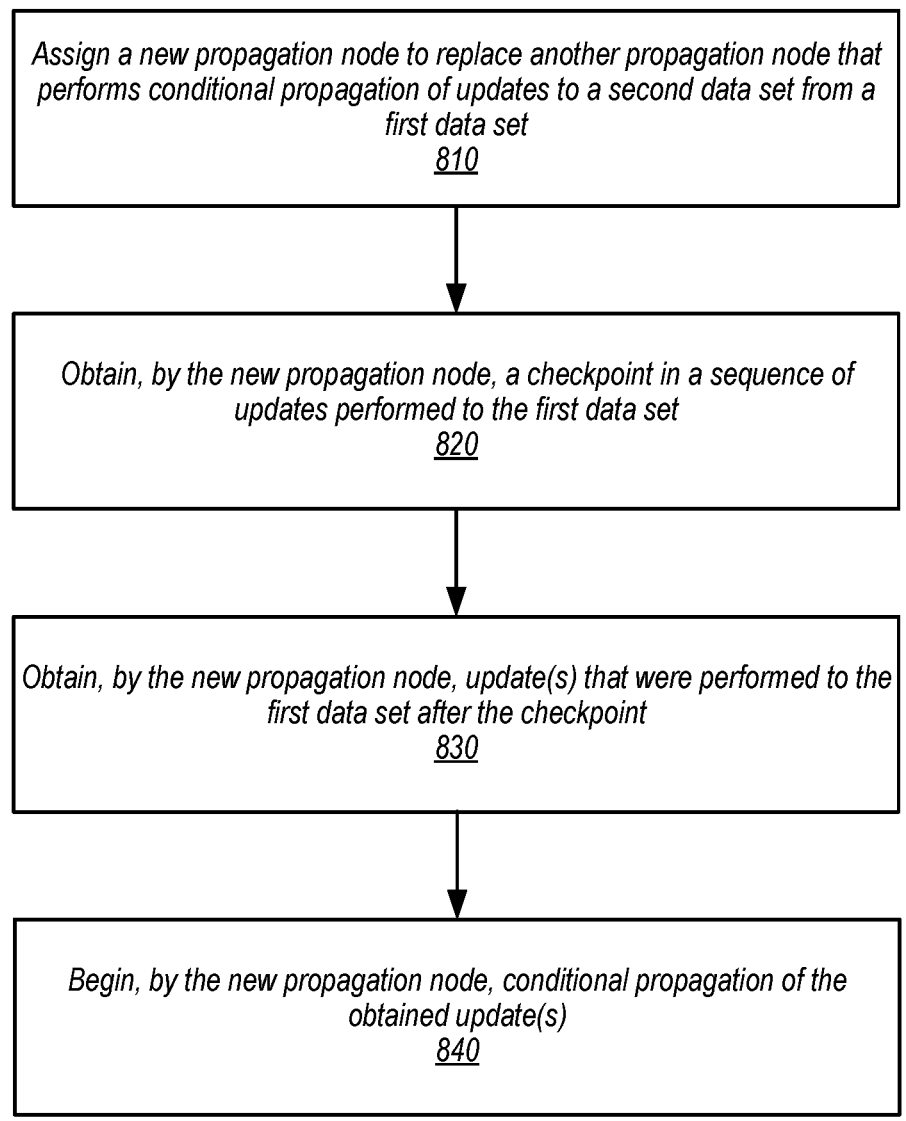
FIG. 8 is a high-level flowchart illustrating various methods and techniques to initialize propagation of updates at a new propagation node, according to some embodiments.

FIG. 8 is a high-level flowchart illustrating various methods and techniques to initialize propagation of updates at a new propagation node, according to some embodiments. As indicated at 810, a new propagation node may be assigned to replace another propagation node that performs conditional propagation of updates to a second data set from a first data set, in various embodiments. As indicated at 820, a checkpoint in a sequence of updates performed to the first data set may be obtained by the new propagation node. As discussed above with regard to FIG. 3, propagation nodes may store checkpoint data in order to indicate where in a sequence of updates propagation has completed. In some embodiments, checkpoints may be specific to individual partitions so that a checkpoint for one partition may be later in the sequence than a checkpoint for another partition.

As indicated at 830, the new propagation may obtain update(s) that were performed to the first data set after the checkpoint, in some embodiments. For example, log sequence numbers for log records representing the updates in a log stream may be evaluated to identify and provide those updates in log records with log sequence numbers that occur after the checkpoint. As noted earlier, in some embodiments, per-partition checkpoints may be obtained so that a checkpoint for one partition may obtain a separate stream of log records from earlier in the sequence of updates (e.g., in order not to miss updates that might be applicable by that partition). As indicated at 840, conditional propagation may be begun by the new propagation node for the obtained updates, in some embodiments.

The methods described herein may in various embodiments be implemented by any combination of hardware and software. For example, in some embodiments, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 9:
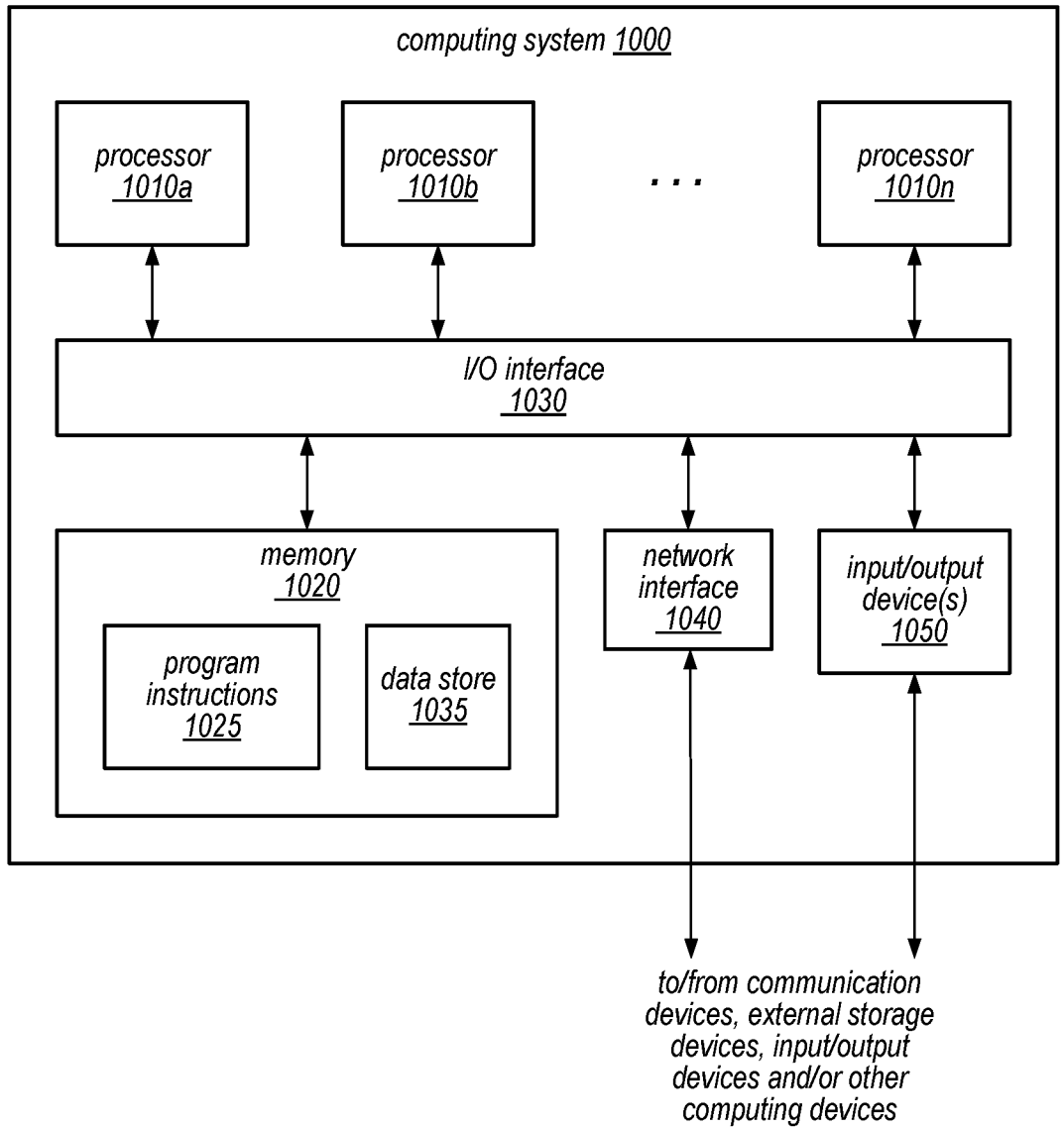
FIG. 9 is a block diagram illustrating an example computing system, according to some embodiments.

Embodiments to implement ordering updates to projected data subsets using conditional operations as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or compute node, computing device or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in some embodiments. In some embodiments, it is contemplated that embodiments may be implemented using a single instance of computer system 1000, while in other embodiments multiple such systems, or multiple nodes making up computer system 1000, may host different portions or instances of embodiments. For example, in some embodiments some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in some embodiments. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in some embodiments. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in some embodiments.

System memory 1020 may store program instructions 1025 and/or data accessible by processor 1010 to implement ordering updates to projected data subsets using conditional operations, in some embodiments. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in some embodiments.

In some embodiments, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in some embodiments. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in some embodiments. Multiple input/output devices 1050 may be present in computer system 1000 or may be distributed on various nodes of computer system 1000, in some embodiments. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, that implement the various embodiments of the systems as described herein, and data store 1035, comprising various data accessible by program instructions 1025, in some embodiments. In some embodiments, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    at least one processor; and
    a memory, storing program instructions that when executed by the at least one processor cause the at least one processor to implement a database system, the database system configured to:
        perform an update, received from a client of the database system, to a database stored as part of the database system;
        evaluate the update according to a schema for a secondary index for the database that projects a subset of data from the database to the secondary index, wherein the evaluation determines that the update is to be replicated to the secondary index and wherein the secondary index is stored separately from the database; and
        send a request to conditionally perform the update to the secondary index, wherein the request specifies a second version identifier, wherein the update is performed according to the request after a comparison of a first version identifier associated with the update and the second version identifier associated with the secondary index indicates that performance of the update is consistent with a sequential ordering of different updates performed to the database, and wherein a given update is not performed after a comparison indicates that the given update is not consistent with the sequential ordering of different updates performed to the database.

2. The system of claim 1, wherein the database system is further configured to:
  initialize a propagation session between a propagation node and a storage node for the database table;
  obtain, by the propagation node, a sequence checkpoint for propagating updates to the secondary index; and
  send, by the propagation node, a request to the storage node to start streaming updates using the sequence checkpoint.

3. The system of claim 1, wherein the update deletes an item from the first data set and wherein the database system is further configured to store an entry in a deleted items table that indicates that the item is deleted and wherein the entry includes the first version identifier.

4. The system of claim 1, wherein the database system is a non-relational database service offered by a provider network and wherein the secondary index is created by the database service in response to a request to create the secondary index received from a client via an interface for the non-relational database service.

5. A method, comprising:
  obtaining an update performed to a first data set stored in a first data store;
  determining that the update to the first data set is to be replicated to a second data set stored in a second data store according to a schema for the second data set that projects a subset of data from the first data set to the second data set; and
  sending a request to conditionally perform the update to the second data set at the second data store, wherein the request specifies a second version identifier, wherein the update is performed by the second data store after a comparison of a first version identifier associated with the update and the second version identifier associated with the second data set indicates that performance of the update is consistent with a sequential ordering of different updates performed to the first data set, and wherein a given update is not performed after a comparison indicates that the given update is not consistent with the sequential ordering of different updates performed to the database.

6. The method of claim 5, further comprising:
  receiving a request to initialize a propagation session from storage node for the first data set;
  obtaining a sequence checkpoint for propagating updates to the second data set; and
  sending a request to the storage node to start streaming updates using the sequence checkpoint.

7. The method of claim 5, further comprising storing a checkpoint for propagating updates to the second data set based, at least in part, on a success response received from the second data store.

8. The method of claim 5, wherein the update inserts an item or modifies the item in the first data set and wherein conditionally performing the update to the second data set at the second data store comprises evaluating an entry in a deleted items data set at the second data store that indicates that the item is deleted.

9. The method of claim 5, wherein the update deletes an item from the first data set and wherein the method further comprises storing an entry in a deleted items data set at the second data store that indicates that the item is deleted and wherein the entry includes the first version identifier.

10. The method of claim 5, further comprising:
  obtaining a second update performed to the first data set stored in the first data store;
  determining that the second update to the first data set is to be replicated to the second data set stored in the second data store according to the schema for the second data set;
  conditionally performing the second update to the second data set at the second data store, wherein the second update is not performed by the second data store after a comparison of a third version identifier associated with the second update and a fourth version identifier associated with the second data set indicates that performance of the second update is not consistent with the ordering of updates performed to the first data set.

11. The method of claim 5, further comprising:
  obtaining a second update performed to the first data set stored in the first data store; and
  determining that the second update to the first data set is not to be replicated to the second data set stored in the second data store according to the schema for the second data set.

12. The method of claim 5, wherein the first version identifier and the second version identifier are respective timestamps.

13. The method of claim 5, wherein the first data set is a database table hosted by a database service offered by a provider network and wherein the second data set is a secondary index created from the database table by the database service.

14. One or more non-transitory, computer-readable storage media, storing program instructions that when executed on or across one or more computing devices cause the one or more computing devices to implement:
  receiving an update performed to a first data set stored in a first data store;
  evaluating the update according to a schema for a second data set stored in a second data store that projects a subset of data from the first data set to the second data set, wherein the evaluation determines that the update is to be replicated to the second data set; and
  sending a request to the second data store for conditional performance of the update to the second data set at the second data store, wherein the request specifies a second version identifier, wherein the update is performed by the second data store after a comparison of a first version identifier associated with the update and the second version identifier associated with the second data set indicates that performance of the update is consistent with a sequential ordering of different updates performed to the first data set, and wherein a given update is not performed after a comparison indicates that the given update is not consistent with the sequential ordering of different updates performed to the database.

15. The one or more non-transitory, computer-readable storage media of claim 14, storing further instructions that when executed by the one or more computing devices cause the one or more computing devices to implement:
  obtaining a second update performed to the first data set stored in the first data store;
  determining that the second update to the first data set is to be replicated to the second data set stored in the second data store according to the schema for the second data set;
  sending a request to the second data store for conditional performance of the second update to the second data set at the second data store, wherein the second update is not performed by the second data store after a comparison of a third version identifier associated with the second update and a fourth version identifier associated with the second data set indicates that performance of the second update is not consistent with the ordering of updates performed to the first data set.

16. The one or more non-transitory, computer-readable storage media of claim 14, storing further instructions that when executed by the one or more computing devices cause the one or more computing devices to implement:

receiving a request to initialize a propagation session from storage node for the first data set;

obtaining a sequence checkpoint for propagating updates to the second data set; and sending a request to the storage node to start streaming updates using the sequence checkpoint.

17. The one or more non-transitory, computer-readable storage media of claim 14, storing further instructions that when executed by the one or more computing devices cause the one or more computing devices to implement storing a checkpoint for propagating updates to the second data set based, at least in part, on a success response received from the second data store.

18. The one or more non-transitory, computer-readable storage media of claim 14, wherein the update deletes an item from the first data set and wherein the one or more non-transitory, computer-readable storage media store further instructions that when executed by the one or more computing devices cause the one or more computing devices to implement storing an entry in a deleted items data set at the second data store that indicates that the item is delete and wherein the entry includes the first version identifier.

19. The one or more non-transitory, computer-readable storage media of claim 14, wherein the update inserts an item or modifies the item in the first data set and wherein, in conditionally performing the update to the second data set at the second data store, the program instructions cause the one or more computing devices to implement evaluating an entry in a deleted items data set at the second data store that indicates that the item is deleted.

20. The one or more non-transitory, computer-readable storage media of claim 14, wherein the second version identifier is stored as a system attribute that is not accessible to a client application for the second data store.

* * * * *